(12) United States Patent
Stanton

(10) Patent No.: US 8,175,793 B2
(45) Date of Patent: May 8, 2012

(54) NAVIGATION DEVICE

(75) Inventor: Richard Stanton, Aukland (NZ)

(73) Assignee: Mitac International Corp., Taoyuan (TW)

( * ) Notice: Subject to any disclaimer, the term of this patent is extended or adjusted under 35 U.S.C. 154(b) by 498 days.

(21) Appl. No.: 12/372,176

(22) Filed: Feb. 17, 2009

(65) Prior Publication Data

US 2010/0211303 A1 Aug. 19, 2010

(51) Int. Cl.
*G06F 19/00* (2011.01)
(52) U.S. Cl. ........................................ 701/200
(58) Field of Classification Search .................. 701/200
See application file for complete search history.

(56) References Cited

U.S. PATENT DOCUMENTS

| | | | |
|---|---|---|---|
| 5,948,040 A * | 9/1999 | DeLorme et al. | ............. 701/426 |
| 6,421,606 B1 * | 7/2002 | Asai et al. | ..................... 701/209 |
| 7,342,516 B2 * | 3/2008 | Kato et al. | ............... 340/995.19 |

OTHER PUBLICATIONS

Mitchell, William, Critique, Architectural Record; Aug. 2007, vol. 195 Issue 8, p. 55-56, downloaded from ProQuestDirect on the Internet on Mar. 2, 2012, 6 pages.*

* cited by examiner

*Primary Examiner* — James Zurita
(74) *Attorney, Agent, or Firm* — WPAT, P.C.; Anthony King

(57) ABSTRACT

A navigation device capable of displaying the public transportation service and method thereof are disclosed. The navigation device comprises a navigation module and a map database. The map database is for storing at least one digital map and the frequency of runs and the route forming the at least one public transportation service. The navigation module is for providing a navigation function and displaying the digital map and the route forming the public transportation service on the digital map for indication. The route is displayed by a different color, a different shape of the icon, or a different level of transparency, for the public transportation service having different frequency of runs.

6 Claims, 5 Drawing Sheets

NAVIGATION DEVICE

FIELD OF THE INVENTION

The invention relates to a navigation device, and more particularly to a navigation device capable of displaying routes of the public transportation services on the digital map by different display characteristics based on frequencies of runs of the public transportation services.

BACKGROUND OF THE INVENTION

As the global positioning system (GPS) becomes increasingly popular, more and more customers like to take a navigation device with them for the purpose of obtaining the map information of the location where they are immediately, or for the purpose of using the navigation function.

When a user is traveling, he/she sometimes desires to know the frequencies of runs of the public transportation services near his/her location, for choosing one of the public transportation services to travel by. However, the conventional navigation device can only display the location of the public transportation services nearby, and provide timetable when the user selects one public transportation service.

Referring to FIG. 1 for a schematic view of an embodiment of display of the navigation device in accordance with the prior art, a navigation device displays a digital map 1 and an icon 11 of the railway station, an icon 12 of the subway station, and three icons (131, 132, and 133) of bus stops on the digital map. When user selects one icon, such as the icon 131, the navigation device displays the timetable 14 of the bus stop corresponding to the icon 131. However, it is inconvenient for the user to check the timetable of the public transportation stops.

In view of the drawbacks of the prior art, the inventor of the present invention based on years of experience in the related industry to develop a navigation device to overcome the drawbacks of the prior art.

SUMMARY OF THE INVENTION

Therefore, it is one objective of the present invention to provide a navigation device capable of displaying routes of the public transportation services by different display characteristics corresponding to the frequencies of runs of the public transportation services to improve the benefit of the navigation device.

In a first aspect, the invention of the navigation device comprises a navigation module and a map database. The map database is for storing at least one digital map and the frequency of runs of at least one public transportation service and a route forming the public transportation service. The navigation module is for providing a navigation function and displaying the digital map and the route forming said public transportation service on the digital map for indication. The route is displayed according to a display characteristic of the route which corresponds to the frequency of runs of the public transportation service. Thereby, a direct selection of a start point, a transit point or a destination point on said route for performing said navigation function is allowed.

Preferably, the public transportation service comprises a bus service, a subway service, a railway service or a high speed railway service.

Preferably, the display characteristic comprises the color of the route, the icon of the route, the level of transparency of the route.

Preferably, the frequency of runs of the public transportation service is classified into a plurality of levels, and the public transportation service having a different level of the frequency of runs is indicated by the route with a different color.

Preferably, the frequency of runs of the public transportation service is classified into a plurality of levels, and the public transportation service having a different level of the frequency of runs is indicated by the route with a different shape of the icon.

Preferably, the frequency of runs of the public transportation service is classified into a plurality of levels, and the public transportation service having a different level of the frequency of runs is indicated by the route with a different level of transparency.

Preferably, the frequency of runs of the public transportation service is classified into a plurality of levels, and the public transportation service having a different level of the frequency of runs is indicated by the route with a different text.

Preferably, the frequency of runs of the public transportation service indicates the number of departures for the public transportation service in a certain period of time.

In a further aspect, the invention comprises a method of indicating at least one public transportation service on a digital map, and has the steps of:

i) providing at least one digital map and the frequency of runs of at least one public transportation service and a route forming the public transportation service from a map database;

ii) displaying the digital map and displaying the route on the digital map according to a display characteristic which is corresponding to said frequency of runs of said public transportation service for indication by a navigation module; and iii) allowing a direct selection of a start point, a transit point or a destination point on said route and performing a navigation function accordingly by said navigation module.

Preferably, the public transportation service comprises a bus service, a subway service, a railway service or a high speed railway service.

Preferably, the display characteristic comprises the color of the route, the icon of the route, or the level of transparency of the route.

Preferably, the method further comprises a step of classifying the frequency of runs of the public transportation service into a plurality of levels, wherein the public transportation service having a different level of frequency of runs is indicated by the route with a different color.

Preferably, the method further comprises a step of classifying the frequency of runs of the public transportation service into a plurality of levels, wherein the public transportation service having a different level of frequency of runs is indicated by the route with a different shape of the icon.

Preferably, the method further comprises a step of classifying the frequency of runs of the public transportation service into a plurality of levels, wherein the public transportation service having a different level of frequency of runs is indicated by the route with a different level of transparency.

Preferably, the method further comprises a step of classifying the frequency of runs of the public transportation service into a plurality of levels, wherein the public transportation service having a different level of frequency of runs is indicated by the route with a different text.

Preferably, the frequency of runs of the public transportation service indicates the number of departures for the public transportation service in a certain period of time.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE PREFERRED EMBODIMENTS

The present invention relates to a navigation device capable of displaying the route forming the public transportation service. While the specifications describe at least one embodiment of the invention considered best modes of practicing the invention, it should be understood that the invention may be implemented in many ways and is not limited to the particular examples described below or to the particular manner in which any features of such examples are implemented.

Figure 1:
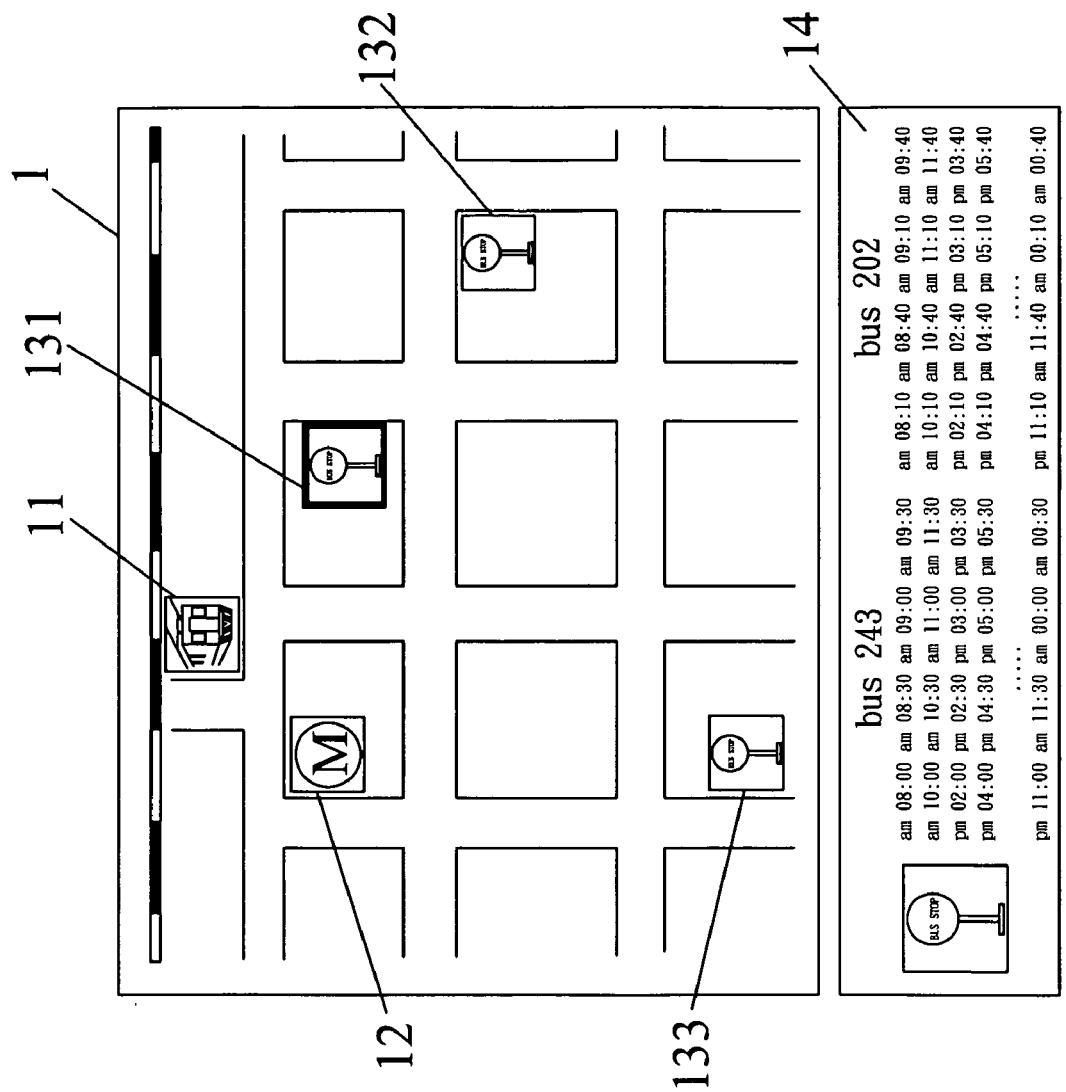
FIG. 1 is a schematic view of an embodiment of display of the navigation device in accordance with the prior art.
Figure 2:
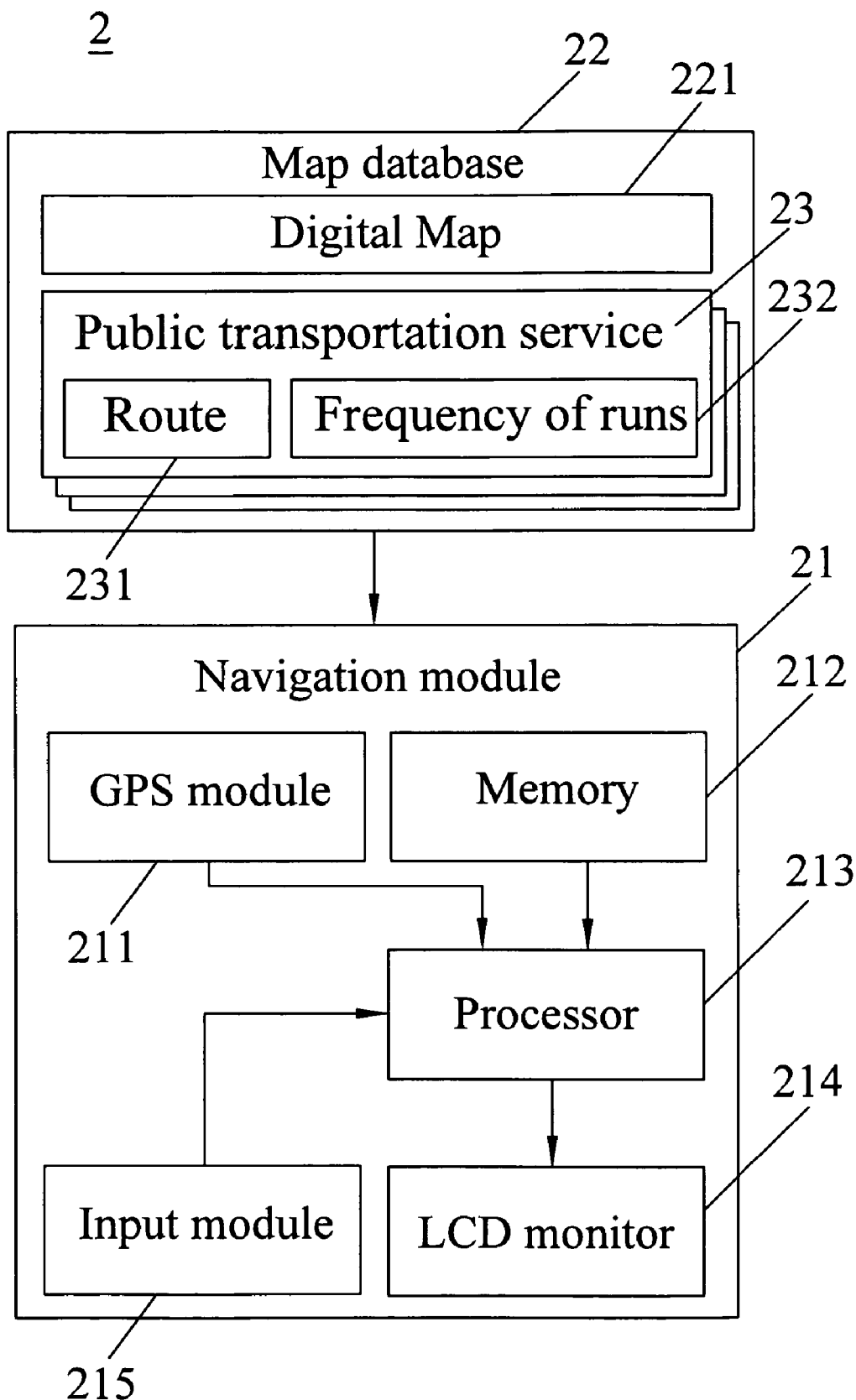
FIG. 2 is a block diagram of an embodiment of the navigation device in accordance with the present invention.

Referring to FIG. 2 for a block diagram of an embodiment of the navigation device in accordance with the present invention, the navigation device 2 comprises a navigation module 21 and a map database 22. The map database 22 is for storing at least one digital map 221 and the frequency 232 of runs of at least one public transportation service 23 and the route 231 forming said public transportation service 23. Preferably, the public transportation service 23 may comprise a bus service, a subway service, a railway service or a high speed railway service. Preferably, the frequency 232 of runs of the public transportation service 23 may indicate the number of departures for the public transportation service 23 in a certain period of time.

Preferably, the navigation module 21 may comprise a GPS module 211, a memory 212, a processor 213, an LCD monitor 214 and an input module 215. The GPS module 211 is for receiving GPS signals from receivable GPS satellites and analyzing the received GPS signals for determining its present location coordinate, and passes this information on to a processor 213. The processor 213 obtains a digital map 221 of the local vicinity from a map database 22, based on the determined position. And the processor 213 then drives the LCD monitor 214 to display the position of the navigation device 2 on the digital map. After a user enters details of a desired destination by using the input module 215, the processor 213 will calculate an appropriate route to the destination and drive the LCD monitor 214 to display the route and navigation information for directing the user to the destination. In calculation of the appropriate route, the public transportation service may be considered as the part of the appropriate route, such as the route for a walker or a rider. The memory 212 is for storing the programs executed by the processor. Therefore, the navigation module 21 may be able to provide a navigation function. Preferably, the navigation device 2 is a global positioning apparatus, a portable communication apparatus or a personal digital assistant.

While driving the LCD monitor 214 to display the digital map, the processor 213 drives the LCD monitor 214 to display the route forming the public transportation service on the digital map for indication, and the route is displayed according to a display characteristic of the route, which is corresponding to the frequency of runs of said public transportation service. Preferably, display characteristic may comprise the color of the route, the icon of the route, the level of transparency of the route or the text of the route. Preferably, the frequency of runs of the public transportation service is classified into a plurality of levels, and the route forming the public transportation service having a different level of frequency of runs may be indicated by a different color, or a different shape of the icon, or a different level of transparency.

Preferably, the color of the route forming the public transportation service having higher frequency of runs is brighter and highlighted, such as white, red or yellow, and the color of the route forming the public transportation service having lower frequency of runs is darker and unobvious, such as blue, green or black.

Preferably, the icon of the route forming the public transportation service having higher frequency of runs may be thicker a solid line, and the icon of the route forming the public transportation service having lower frequency of runs may be thinner or a dotted line.

Preferably, the level of transparency of the route forming the public transportation service having higher frequency of runs is lower than the public transportation service having lower frequency of runs.

Besides, the stops of the public transportation service may also be displayed on the digital map by icons with a different color, or a different shape of the icon, or a different level of transparency, or a different text depending on the frequency of the runs of the public transportation service.

Thereby, a direct selection of a start point, a transit point or a destination point on the digital map for performing said navigation function is allowed. More specifically, a user may select a desired point on the rout, such as a bus stop or a train station with more frequent departures, as the start point, the transit point, or the destination point for his/her trip.

Figure 3:
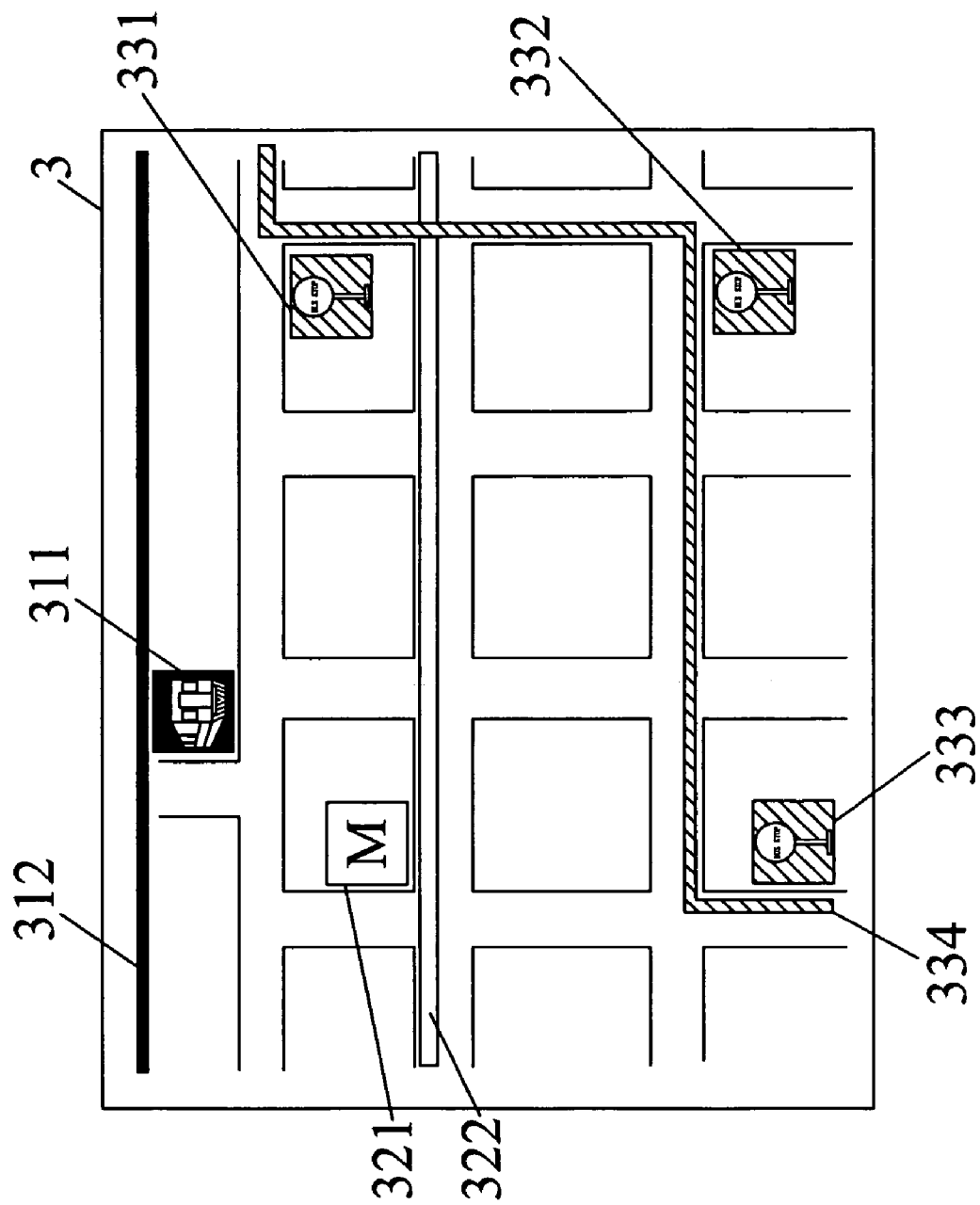
FIG. 3 is a schematic view of an embodiment of display of the navigation device in accordance with the present invention.

Referring to FIG. 3 for a schematic view of an embodiment of display of the navigation device in accordance with the present invention, a navigation device displays a digital map 3 and an icon 311 of the railway station, the route 312 of railway service, an icon 321 of the subway station, the route 322 of subway service, three icons (331, 332, and 333) of bus stops and the route 334 of the bus service on the digital map.

In this embodiment, the public transportation services having different frequencies of runs are represented by the routes and the icons with different colors for helping the users to recognize the frequencies of the runs of the public transportation services easily. The frequency of the runs of the subway service is higher than the railway service, and the available scheduled frequency at of the subway station is higher than the railway station, so the color of the station icon 321 and the route 322 may alternatively be provided as for example, a brighter color or a highlighted color, and the color of the station icon 311 and the route 312 may alternatively be provided as for example, a darker color or an unobvious color. The frequency of the runs of the subway station is about twenty available vehicle departures per hour, and the frequency of the runs of the bus station is about six available vehicle departures per hour, and the frequency of the runs of the railway station is about two available vehicle departures per hour. In FIG. 3, therefore, the color of station icon 311 and the route 312 is darker than the color of icons (331, 332, and 333) and the route 334 which is darker than the color of station icon 321 and the route 322. For example, the color of the station icon 311 and the route 312 of railway service may be black, the color of the station icon (331, 332, and 333) and the route 334 of bus service may be blue, and the color of the station icon 321 and the route 322 of subway service may be white.

It should be noted that the display characteristic may further include coloring the route between the railway stations/public transportation stops/subways and destinations (not shown in the figure) to clearly show the navigation path, not limiting the icon or the level of transparency.

Therefore, the navigation device allows the user to assess the frequency of the public transport service along or near their route and make an informed decision as to the best choice for their requirements, without the complexity of selecting a particular bus/tram route or timetable.

Figure 4:
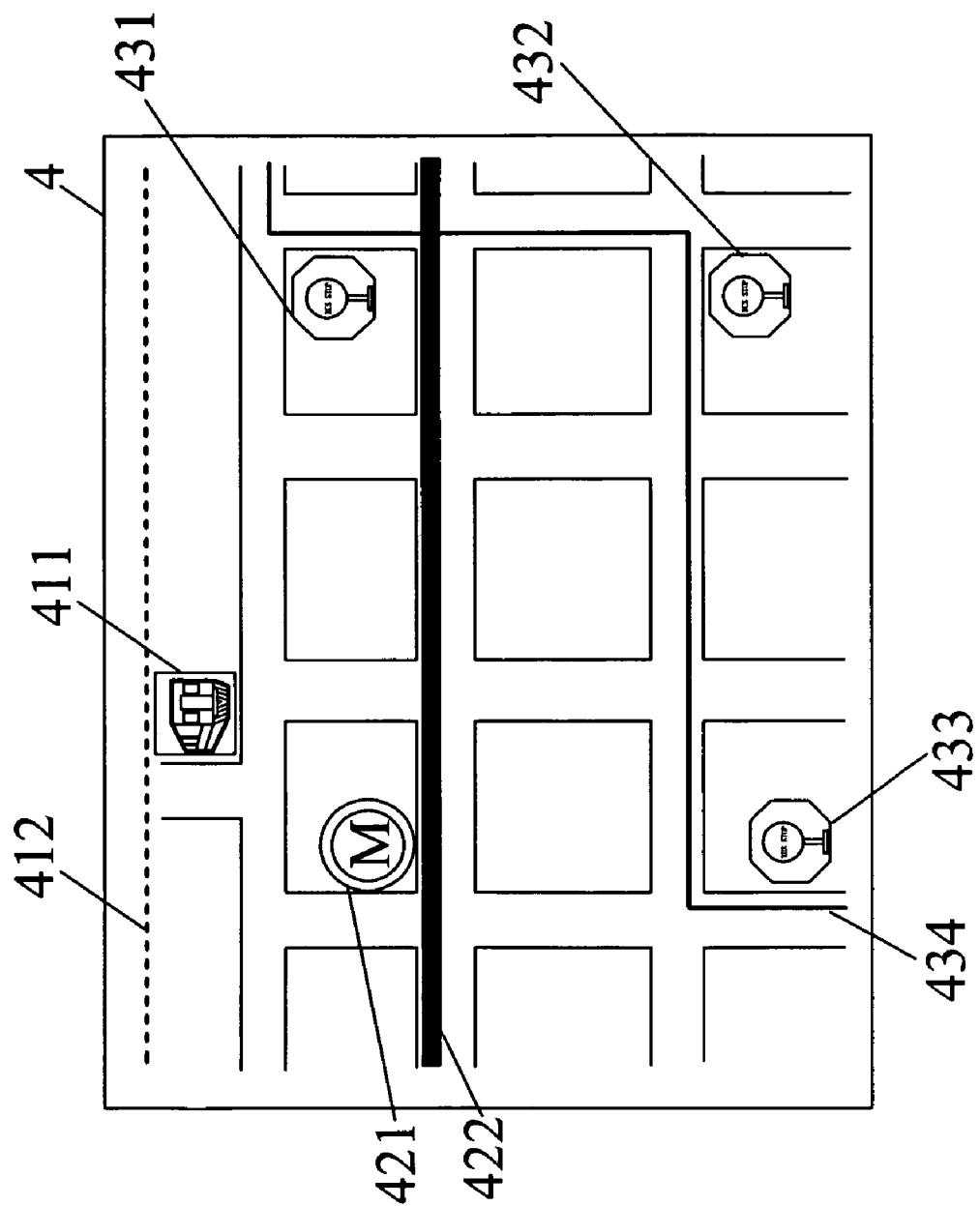
FIG. 4 is a schematic view of another embodiment of display of the navigation device in accordance with the present invention.

Referring to FIG. 4 for a schematic view of another embodiment of display of the navigation device in accordance with the present invention, a navigation device displays a digital map 4 and an station icon 411 and the route 412 of the railway service, an station icon 421 and the route 422 of the subway service, and three stop icons (431, 432, and 433) and the route 434 of bus service on the digital map. In this embodiment, the public transportation services having different frequencies of runs are represented by the station icons and routes with different shapes of icons for helping the users to recognize the frequencies of the runs of the public transportation services easily. The frequency of the runs of the subway service is the highest degree, so that the shape of the station icon 421 is circular and the route 422 is thicker line. The shape of the stop icon (431, 432, and 433) is octagon and the route 434 is a solid line. And the frequency of the runs of the railway station is the lowest degree, so that the shape of the station icon 411 is quadrangle and the route 412 is a dotted line.

Figure 5:
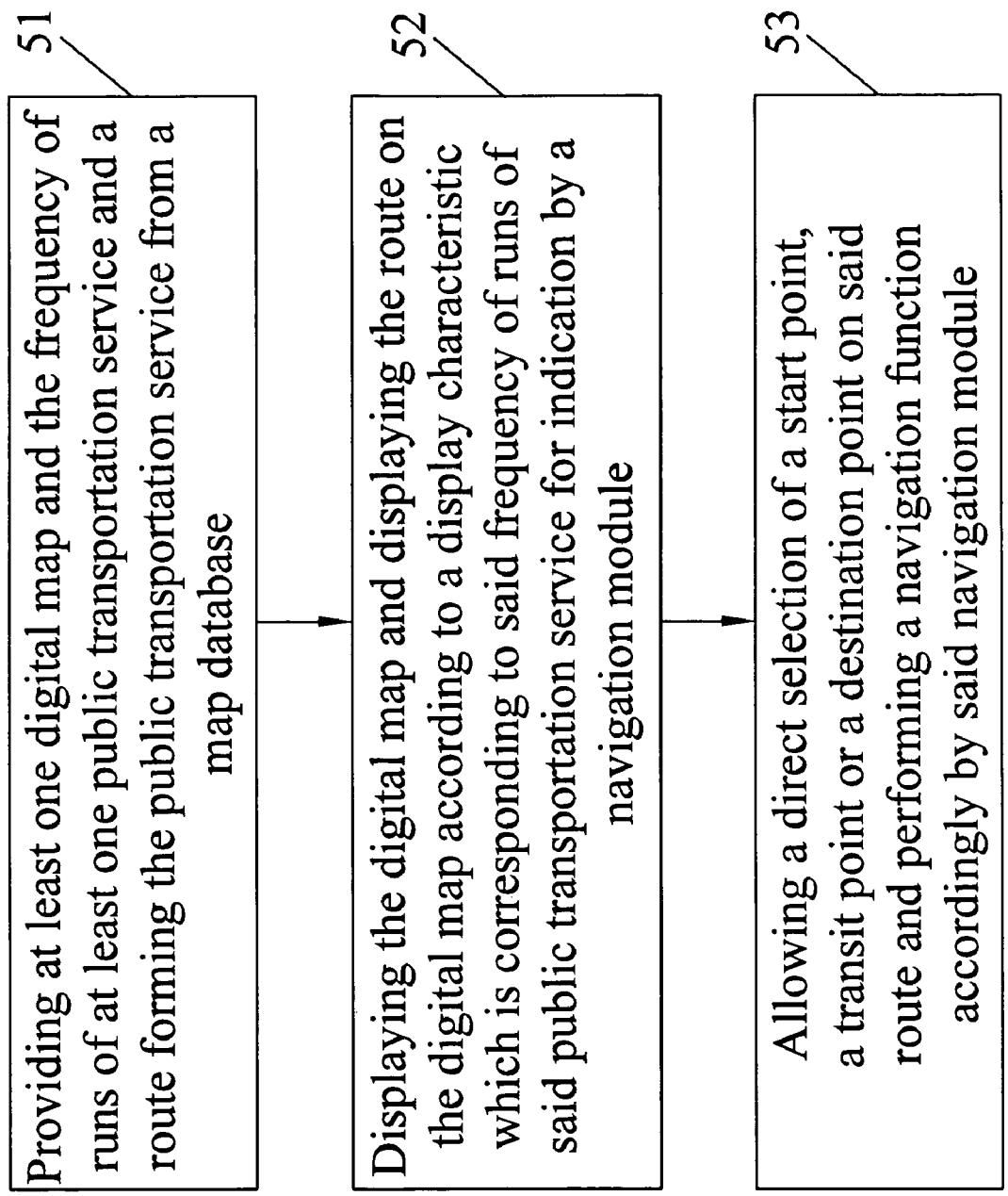
FIG. 5 is a flow diagram of the method of indicating at least one public transportation service on a digital map in accordance with the present invention.

Referring to FIG. 5 for a flow diagram of the method of indicating at least one public transportation service on a digital map in accordance with the present invention, at step 51, at least one digital map and the frequency of runs of at least one public transportation service and the route forming the public transportation service are provided by the map database. Preferably, the public transportation service may comprise a bus service, a subway service, a railway service or a high speed railway service. Preferably, the frequency of runs of the public transportation service indicates the number of departures for the public transportation service in a certain period of time.

At step 52 the digital map is displayed and the route forming the public transportation service is displayed on the digital map according to a display characteristic which is corresponding to said frequency of runs of said public transportation service for indication by the navigation module. Preferably, the icons for stops of the public transportation service may also be displayed on the digital map. Preferably, the frequency of runs of the public transportation service is classified into a plurality of levels, and the public transportation service having different level of frequency of runs is indicated by the route with a different color, or a different shape of the icon, or a different level of transparency. For example, the color of the icon of the public transportation service having higher frequency of runs is brighter, such red or yellow, and the color of the icon of the public transportation service having lower frequency of runs is darker, such blue or green.

At step 53 a direct selection of a start point, a transit point or a destination point on said route for performing said navigation function is allowed. More specifically, a user may select a desired point on the rout, such as a bus stop or a train station with more frequent departures, as the start point, the transit point, or the destination point for his/her trip.

While the present invention has been described by way of example and in terms of a preferred embodiment, it is to be understood that the present invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A navigation device, comprising:
   a map database for storing at least one digital map, a timetable of at least one public transportation service, and a route forming said public transportation service; and
   a navigation module for performing a navigation function and displaying said digital map and said route;
   wherein said route is displayed according to a display characteristic which is corresponding to said timetable of said public transportation service, thereby allowing a direct selection of a start point, a transit point or a destination point on said route for performing said navigation function;
   wherein said timetable of said public transportation service is classified by operating frequency, and said public transportation service having different operating frequency is indicated by said route with a different color, or shape of an icon, or level of transparency, or a combination thereof.

2. The navigation device of claim 1, wherein said public transportation service comprises a bus service, a subway service, a railway service or a high speed railway service.

3. The navigation device of claim 1, wherein said timetable of said public transportation service indicates a number of departures for said public transportation service.

4. A method of indicating at least one public transportation service on a digital map, said method comprising the steps of
   providing at least one digital map, a timetable of each of the at least one public transportation service and a route forming said public transportation service from a map database;

displaying said digital map and displaying said route on said digital map according to a display characteristic which is corresponding to said timetable of said public transportation service for indication by a navigation module; and allowing a direct selection of a start point, a transit point or a destination point on said route and performing a navigation function accordingly by said navigation module;

wherein said timetable of said public transportation service is classified by operating frequency, and said public transportation service having different operating frequency is indicated by said route with a different color, or shape of an icon, or level of transparency, or a combination thereof.

5. The method of claim 4, wherein said public transportation service comprises a bus service, a subway service, a railway service or a high speed railway service.

6. The method of claim 4, wherein said frequency timetable of said public transportation service indicates a number of departures for said public transportation service.

* * * * *